US008924621B2

(12) United States Patent
Jadus

(10) Patent No.: US 8,924,621 B2
(45) Date of Patent: Dec. 30, 2014

(54) METHOD AND SYSTEM FOR DETECTING AND ASSERTING BUS SPEED CONDITION IN A USB ISOLATING DEVICE

(75) Inventor: Brian Kirk Jadus, Williston, VT (US)

(73) Assignee: Linear Technology Corporation, Milpitas, CA (US)

( * ) Notice: Subject to any disclaimer, the term of this patent is extended or adjusted under 35 U.S.C. 154(b) by 1078 days.

(21) Appl. No.: 12/940,434

(22) Filed: Nov. 5, 2010

(65) Prior Publication Data

US 2012/0117294 A1 May 10, 2012

(51) Int. Cl.
*G06F 13/36* (2006.01)
*G06F 3/00* (2006.01)
*G06F 13/40* (2006.01)

(52) U.S. Cl.
CPC ........ *G06F 13/4027* (2013.01); *G06F 13/4004* (2013.01)
USPC ................ 710/314; 710/11; 710/16; 710/306

(58) Field of Classification Search
USPC ............. 710/15–16, 105–106, 305–306, 311, 710/313, 314, 11; 250/551
See application file for complete search history.

(56) References Cited

U.S. PATENT DOCUMENTS

| | | | |
|---|---|---|---|
| 6,526,468 B1 * | 2/2003 | Larochelle et al. ........... | 710/305 |
| 6,584,519 B1 * | 6/2003 | Russell ........................... | 710/62 |
| 6,820,160 B1 * | 11/2004 | Allman ......................... | 710/305 |
| 2006/0265540 A1 | 11/2006 | Mass et al. | |
| 2008/0235524 A1 * | 9/2008 | Sharma et al. ................ | 713/300 |
| 2009/0013111 A1 * | 1/2009 | Berland et al. ................ | 710/106 |
| 2009/0031056 A1 | 1/2009 | Bliss et al. | |
| 2010/0250820 A1 | 9/2010 | Gaalaas et al. | |

OTHER PUBLICATIONS

Extended European Search Reports issued in European Patent Application No. 11008786.3, dated Dec. 29, 2011.

* cited by examiner

*Primary Examiner* — Thomas J Cleary
(74) *Attorney, Agent, or Firm* — McDermott Will & Emery LLP

(57) ABSTRACT

An apparatus and method for a Universal Serial Bus (USB) isolating device. An USB isolating device includes a downstream facing circuit and a upstream facing circuit. The downstream facing circuit is coupled to a peripheral device via a first pair of signals and is configured for detecting a speed at which the peripheral device is operating based on a first voltage configuration on the first pair of signals. The upstream facing circuit is coupled to the downstream facing circuit and a host/hub via a second pair of signals and is configured for communicating with the downstream facing circuit on the speed of the peripheral device and adaptively creating a second voltage configuration on the second pair of signals to facilitate the host/hub to adapt to the speed of the peripheral device.

15 Claims, 18 Drawing Sheets

METHOD AND SYSTEM FOR DETECTING AND ASSERTING BUS SPEED CONDITION IN A USB ISOLATING DEVICE

BACKGROUND

1. Technical Field

The present teaching relates to method and system for USB. More specifically, the present teaching relates to method and system for a USB isolating device and systems incorporating the same.

2. Discussion of Technical Background

The Universal Serial Bus, or USB, is right now the most common serial peripheral bus in existence. USB permits all the most common devices to connect to a computer, to each other, through hubs, and now even wireless USB has become the dominant method of low bandwidth communications between devices and their peripherals. However, isolating a USB is not without difficulties. Various issues occur when isolating a USB bus due to bidirectional signaling and selecting data speeds that other less common peripheral technologies have already solved. The universal nature of a USB bus requires functionality and automatic identification of the capable data speed by a down stream device.

Current examples of USB isolated Hubs handle the isolation in the main upstream bus connection. Conventionally, a USB isolated hub upstream port must maintain the highest speed it is capable of, allowing a fixed speed setting. A hub controller manages the speed control for the expansion ports of the hub. The individual hub ports are observed without isolation and bus speed configuration across the isolation barrier is not necessary.

Bus splitters may include control pins that are manually selectable or software intervention external to the USB bus to select an operating speed. Traditionally, to indicate the bus condition on both sides of an isolation barrier, different means may be adopted. For instance, a fixed bus speed function may be used to indicate either a full speed or a low speed. Alternatively, configuration pins may be used where if the input pin is connected to a high ("1"), it indicates a full speed device and if the input pin is connected to a low ("0"), it indicates a low speed device. Another conventional solution is to use a configuration register and the value stored in the register can be set by an external control device. If the register is set to have a high value, it is a full speed device and otherwise, it is a low speed device. These methods statically set the speed of the interface fixing the type of device that may be connected to a single bus speed.

This conventional solution statically sets the speed of an isolated USB transceiver. Unfortunately, setting the speed conditions in such a static manner prevents the isolating USB transceiver from being used in host or hub downstream facing applications where the speed of the connected peripheral device varies, depending on the peripheral device connected. In addition, because statically setting the speed yields fixed bus speed peripherals when used with an isolating device, it limits the flexibility of the device as a universal USB isolator. In downstream facing host or hub applications, the speed of the connected peripheral is often unknown and frequently has to be dynamically determined based on the condition of the bus during the idle state or bus initialization. To act as a Host, hub, or bus splitter, the downstream facing port needs to determine the bus speed of the peripherals and then report the speed to the upstream facing port. Unfortunately, the conventional solutions are not equipped to accomplish that in an isolator.

SUMMARY

The teachings disclosed herein related to methods and systems for detecting and asserting bus speed condition in a USB isolating device.

In one example, a Universal Serial Bus (USB) isolating device comprises a downstream facing circuit coupled to a peripheral device via a first pair of signals, configured for detecting a speed at which the peripheral device is operating based on a first voltage configuration on the first pair of signals, and an upstream facing circuit coupled to the downstream facing circuit and a host/hub via a second pair of signals, configured for communicating with the downstream facing circuit on the speed of the peripheral device and adaptively creating a second voltage configuration on the second pair of signals to facilitate the host/hub to adapt to the speed of the peripheral device.

In another example, a method for a USB isolating device comprises the steps of detecting, at a first timing by a downstream facing circuit in the USB isolating device, a speed at which a peripheral device is operating based on a first voltage configuration on a first pair of signals through which the downstream facing circuit is coupled to the peripheral device, communicating the detected speed from the downstream facing circuit to an upstream facing circuit in the USB isolating device at a second timing, and creating, by the upstream facing circuit, a second voltage configuration on a second pair of signals, through which the upstream facing circuit couples to a host/hub, to facilitate the host/hub to adapt to the speed of the peripheral device.

BRIEF DESCRIPTION OF THE DRAWINGS

The inventions claimed and/or described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

DETAILED DESCRIPTION

A USB bus interface consists of four wires, VBUS power, ground, and signals D+ and D−, a differential pair. The signals D+ and D− are bidirectional. The idle and active conditions for a USB are defined in USB specification 2.0, which specifies that the idle state (resting state) of signals D+ and D− indicates the communication bus speed of an attached device. With a configuration of a low speed or full speed bus, the D+ and D− signals are connected to the referenced ground or a 3.3V power supply through, e.g., a 1.5 k Ohm resistor. With a configuration of a high-speed bus, the D+ and D− signals are terminated with, e.g., 45 Ohm resistors.

Figure 1:
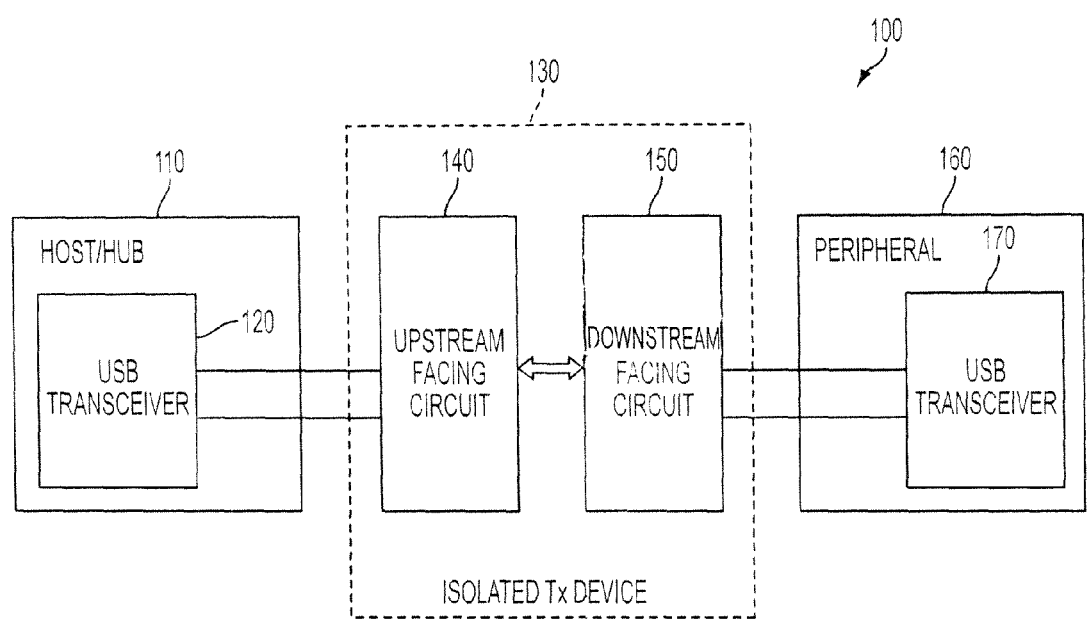
FIG. 1 depicts an isolated transceiver device and its connections to a peripheral device and a USB host/hub.

Isolated USB systems include a pair of signal control devices and an isolation component or system. To isolate bidirectional signals, data flow direction needs to be managed to prevent the bus from being locked up. FIG. 1 depicts an isolated transceiver device 130 and its connections to a peripheral device 160 and a USB host/hub 110. The isolated transceiver device 130 for a USB comprises an upstream facing circuit 140, facing toward the upstream or the host/hub 110, and a downstream facing circuit 150, facing toward a downstream hub device or peripheral device 160. The host/hub 110 includes a USB transceiver 120 that interfaces with the upstream facing circuit 140, via which data are transmitted and received to/from the peripheral device 160. The peripheral device 160 includes a USB transceiver 170 that interfaces with the downstream facing circuit 150, via which data are transmitted and received to/from the host/hub 110.

Within the isolation transceiver device 130, the bidirectional (upstream and downstream) information to be communicated between the host/hub 110 and the peripheral device 160 is transmitted and received across the isolation transceiver 130. The bidirectional data are reduced to unidirectional data and, at the same time, control signals are generated. As will be explained below, those control signals are used for dynamically adapting the speed. According to the present teaching, the downstream facing circuit 150 senses the idle state of the peripheral device 160 and determines the speed of the peripheral device (low, full, or high speed). Based on the sensed idle state, the downstream facing circuit controls a set of resistors to match. Specifically, the idle state is sensed based on the D2+ and D2− signals on the USB bus. The configuration of these signals indicates the speed at which the peripheral device is operating based on the USB 2.0 specification.

Such detected speed is reported to the upstream facing circuit 140, which then replicates the downward facing bus condition with a resistor configuration that matches with that of the peripheral device. This creates a condition that a host device will see as if it is interfacing directly with the peripheral device. To do so, the upstream facing circuit 140 controls the connection of a pull up resistor or a pair of pull down resistors to be in the same configuration position as what is sensed by the downstream facing circuit 150 based on signals D2+ and D2− (connecting to the peripheral device 160).

In operation, the isolated transceiver device 130 observes the impedance condition on D2+ and D2− (or the D2+ and D2− signal configuration) and then replicates the observed impedance condition at the interface with the host/hub 110. There are different impedance configurations depending on the speed of the peripheral device 160. When the downstream facing circuit 150 observes a high on D2+ and a low on D2−, it indicates a full speed downstream facing bus to the upstream bus. The downstream facing circuit 150 notifies the upstream facing circuit 140 of the detected idle state configuration. The upstream facing circuit 140 then accordingly configures a pair of pull up resistors connected to D1+ and D1− in a way that matches the configuration observed by the downstream facing circuit at signals D2+ and D2−. This is illustrated in FIG. 2(a), where the downstream facing circuit 150 is connected to a full speed peripheral device 160 and the upstream facing circuit 140 is connected to the host/hub 110.

Specifically, in FIG. 2(a), D2+ is connected to two resistors, a pull up resistor 218 connected to a power supply and a pair of pull down resistors 214 and 216 connected to the ground. The voltage on D2+ is determined based on the ratio of resistances of the pull up resistor 218 and the pair of pull down resistors (e.g., resistors 214 and 216 have resistance of 15 k and resistor 218 has a resistance of 1.5 k). Here, since resistor 216 (connected to the ground) has a much higher resistance than that of resistor 218 (which is connected to a power supply), the voltage observed on D2+ is high. D2− is connected to the ground via pull down resistor 216. The upstream facing circuit 140 includes a pair of pull up resistors 206 and 208, which can be controllably connected to a power supply via switches 240 and 245, respectively. When the configuration of resistors 206 and 208 is observed (as if it observes the peripheral device 160) by the host/hub 110 which indicates a full speed device, it matches by setting the pull down resistors 202 and 204 so that D1+ and D1− signals have a similar configuration as that of signals D2+ and D2−.

The configuration of the pair of pull down resistors 214 and 216 with, e.g., 15 k ohm resistance, and a pull up resistor 218 with, e.g., 1.5 k Ohm resistance determines not only the voltage observed on the data signals D2+ and D2− by the downstream facing circuit 150 but also accordingly the voltages set on the signals D1+ and D1−, which indicates to the host/hub 110 the speed of the data communication. When the D2+ and D2− configuration is detected by the downstream facing circuit 150, it is reported, across an isolated barrier, to the upstream facing circuit 140. The communication between the two is through a USB transceiver downstream interface 212 and a USB transceiver upstream interface 210. Based on the reported information, the upstream facing circuit 140 replicates the sensed configuration so that the peripheral's speed can be communicated to the host/hub 110. Particularly, the pull up resistors 206 and 208 are configured to match what is sensed at the downstream facing circuit 150.

Figure 2:
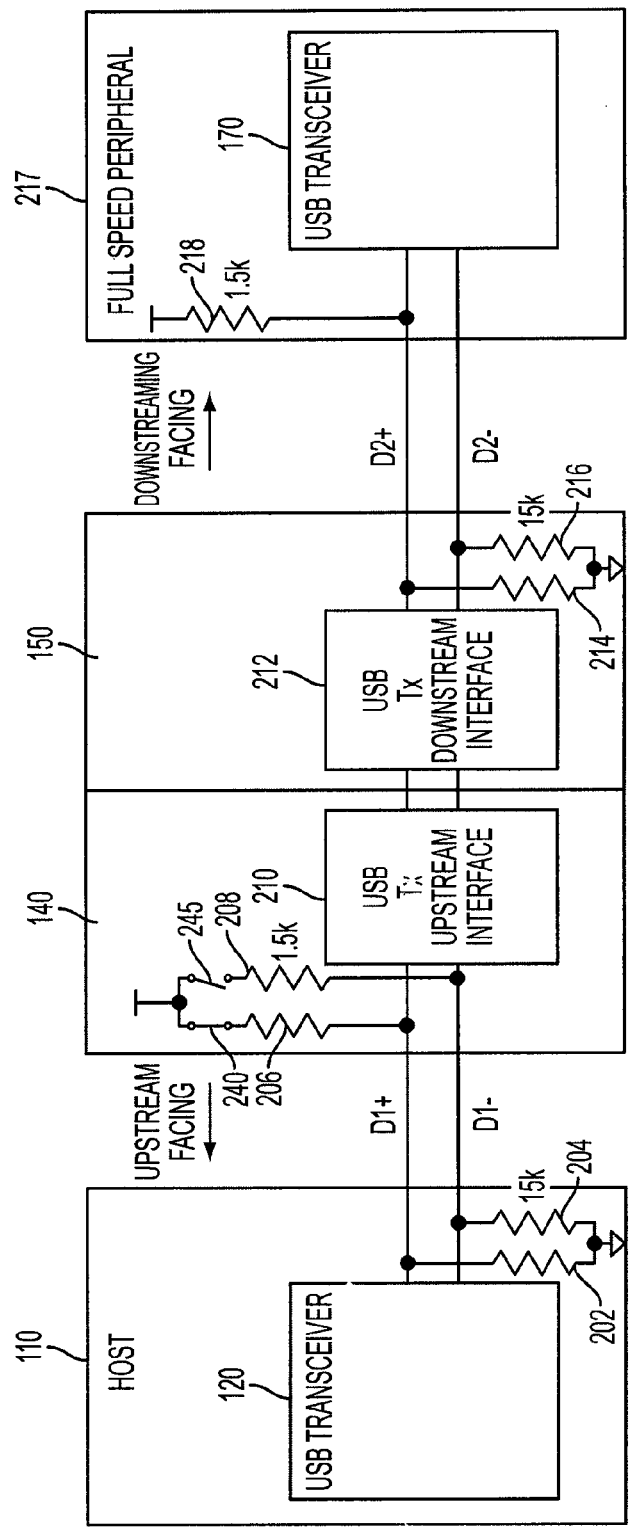
FIG. 2(a) depicts an isolated transceiver device connecting to a full speed peripheral device and a host/hub.
FIG. 2(b) depicts an exemplary circuit for an isolated transceiver device capable of detecting the speed of a full speed peripheral device, according to an embodiment of the present teaching.
Figure 2:
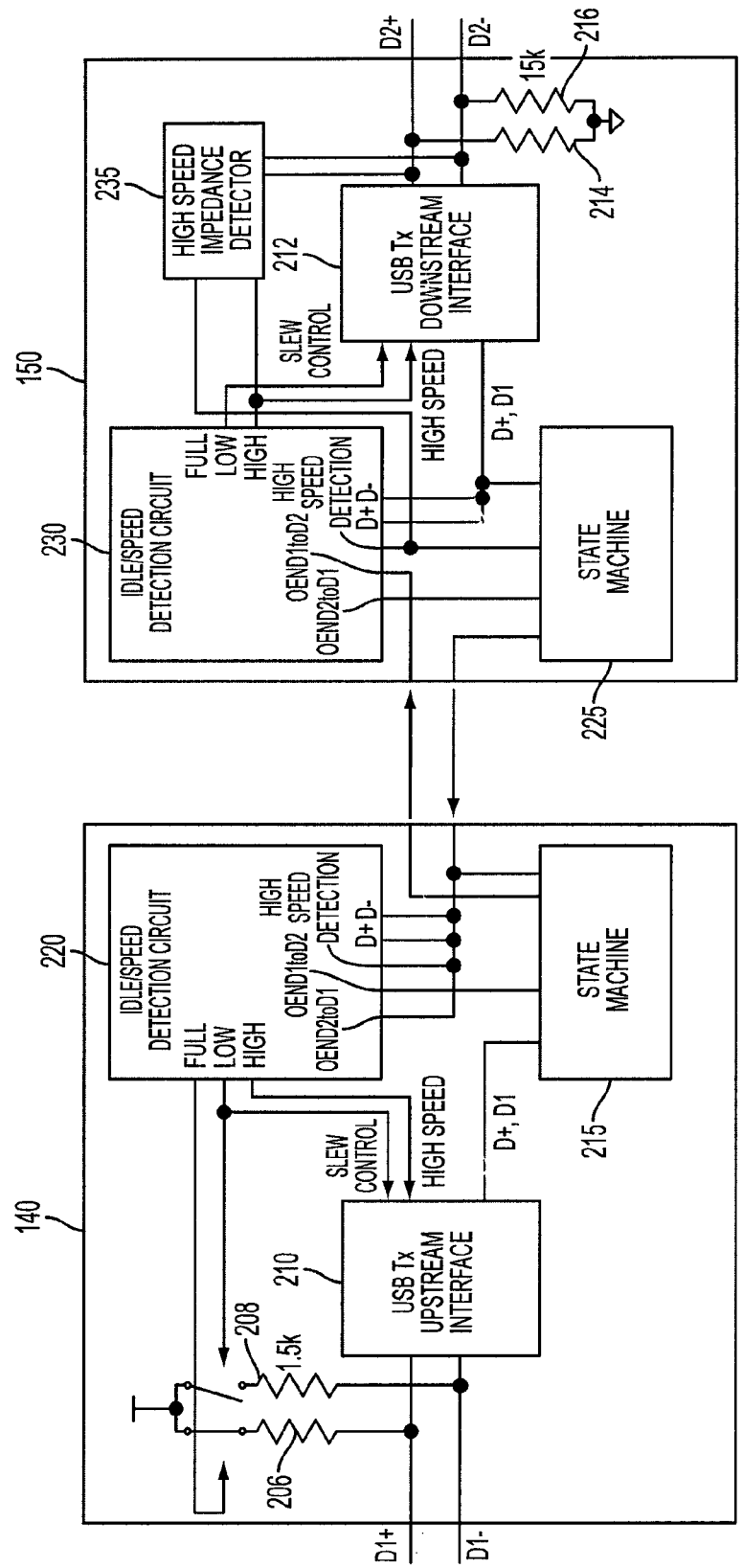

In FIG. 2(*a*), to replicate the configuration, the upstream facing circuit 140 controls the switch 240 so that D1+ is now connected to a power supply via pull up resistor 206 and the switch 245 so that D1− is disconnected from the power supply. In addition, both the upstream and downstream facing circuits include means to control the slew rate and speed of the USB transceiver to maintain proper signaling on the USB bus.

FIG. 2(*b*) depicts exemplary implementation for the isolated transceiver device 130 for detecting the speed of a full speed peripheral device, according to an embodiment of the present teaching. Each of the upstream and downstream facing circuits comprises sub-circuitries for various similar functions. As illustrated, the downstream facing circuit 150 comprises a packet process state machine 225, a USB transceiver downstream interface 212, a high speed impedance detector 235, and an idle/speed detection circuit 230. The upstream facing circuit 140 comprises a packet process state machine 215, a USB transceiver upstream interface 210, and an idle/speed detection circuit 220.

In some embodiments, the idle bus condition may be detected between packet transmissions. In other embodiments, the idle bus condition may be detected during bus initialization. In illustrated implementations, the static data are repetitiously refreshed on the USB transceiver pins in one or both directions. That is, the static data may be refreshed in the direction from the upstream transceiver to the downstream transceiver and/or from the downstream transceiver to the upstream transceiver. The refreshed static data, sent from the downstream transceiver to the upstream transceiver, include idle/speed information that can be used by the upstream facing circuit 140 to configure appropriate resistors in order to set the bus speed on the upstream facing USB transceiver consistent with the detected peripheral device speed. In addition, the isolated transceiver device may also set the slew rate and data rate conditions based on the reported bus condition.

In operation, the configuration on signals D2+ and D2− is first detected by the high speed impedance detector 235. Different impedance conditions may be detected. For instance, when the observed resistance termination for high speed is 15 k, it indicates a disconnect condition. When the observed resistance termination for high speed is 45 Ohms, it indicates a high speed peripheral is plugged in. If the observed resistance termination is 45 Ohms/45 Ohms, it indicates that a high speed is recognized and local termination is selected. If a short condition is detected, it indicates an invalid system short condition. Details and exemplary implementation of the high speed impedance detector 235 is provided with reference to FIG. 11.

The detected high speed impedance information is then sent to the idle/speed detection circuit 230 and the USB transceiver downstream interface 212. Upon receiving the detected impedance information from the high speed impedance detector 235, the idle/speed detection circuit 230 identifies the idle period and determines the speed of the peripheral device during the idle state, if any, based on the detected impedance on D2+ and D2−. The detection may be accomplished during an appropriate time frame, e.g., between packet transmissions or during bus initialization. Depending on the state of the packet process state machine 225, the static data incorporating the detected speed information is refreshed and is communicated, in an isolated fashion, to the upstream facing circuit 140. Details related to idle and speed detection are provided with reference to FIGS. 7 and 8.

When the state machine 215 and the idle/speed detection circuit 220 receive the refreshed static data communicated from the downstream facing circuit 150, the idle/speed detection circuit 220 configures, at an appropriate time depending on the state of the state machine 215, the configuration of the pair of pull up resistors 206 and 208 as well as the slew rate control based on the received information about the detected speed of the peripheral device 160. Specifically, the idle/speed detection circuit 220 controls switches 240 and 245 (see FIG. 2(*a*)) to connect the pull up resistor 206 to D1+ and disconnect pull up resistor 208 from D1−. With such dynamically set configuration, the D1+ and D1− replicate the condition as if the host/hub 110 sees the signals D2+ and D2− from the peripheral device directly.

Figure 3:
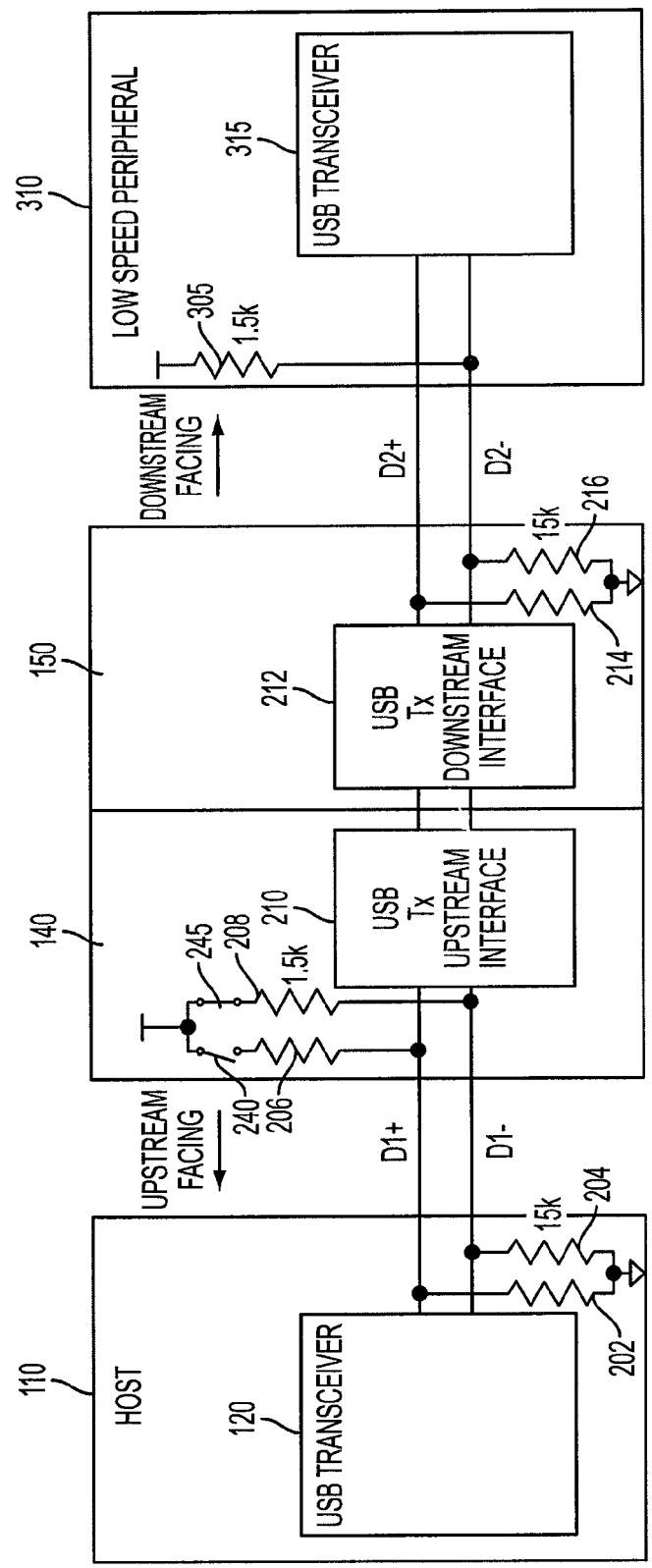
FIG. 3(a) depicts an isolated transceiver device connecting to a low speed peripheral device and a host/hub.
FIG. 3(b) depicts an exemplary circuit for an isolated transceiver device capable of detecting the speed of a low speed peripheral device, according to an embodiment of the present teaching.
Figure 3:
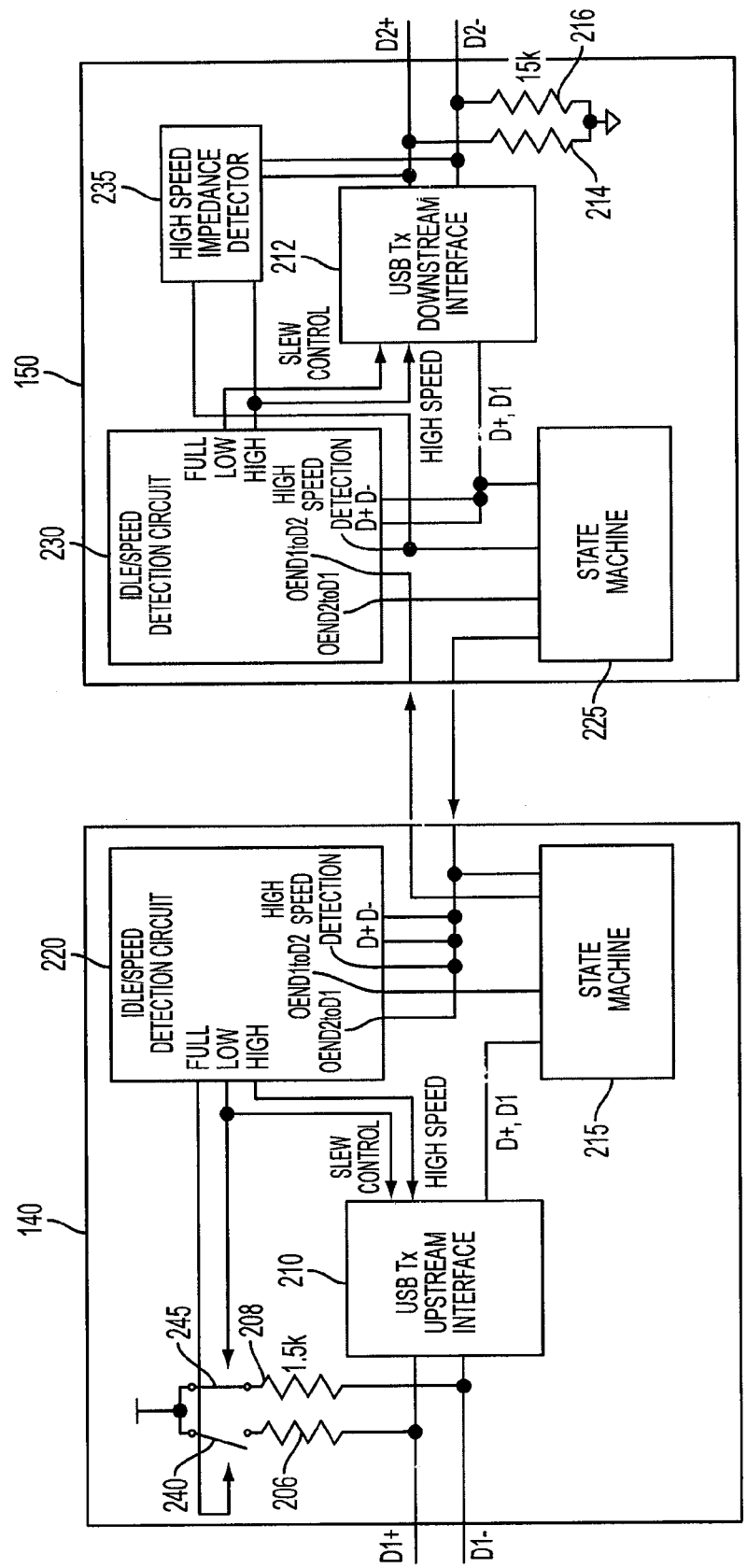

When the downstream facing circuit 150 observes a high on D2− and a low on D2+, indicating a low speed of the peripheral device, it communicates the information to the upstream facing circuit 140 in a similar manner as described with respect to a full speed peripheral device. This is illustrated in FIG. 3(*a*). The upstream facing circuit 140, once being notified of a detected low speed peripheral device, dynamically configures resistors that match the impedance configuration observed on the low speed peripheral device. Specifically, the upstream facing circuit 140 will connect the pull up resistor 208 to the D1− signal and disconnect the pull up resistor 206 to D1+ via switches 240 and 245. FIG. 3(*b*) shows an exemplary implementation of the downstream and upstream facing circuits, through which the impedance condition associated with a low speed peripheral device is replicated via the isolated communication so that the host/hub 110 can see the configuration at the peripheral device, transparently, and can adaptively configure its bus accordingly. The operation of the circuit in FIG. 3(*a*) is similar to what is described with reference to FIG. 2(*b*).

Figure 4:
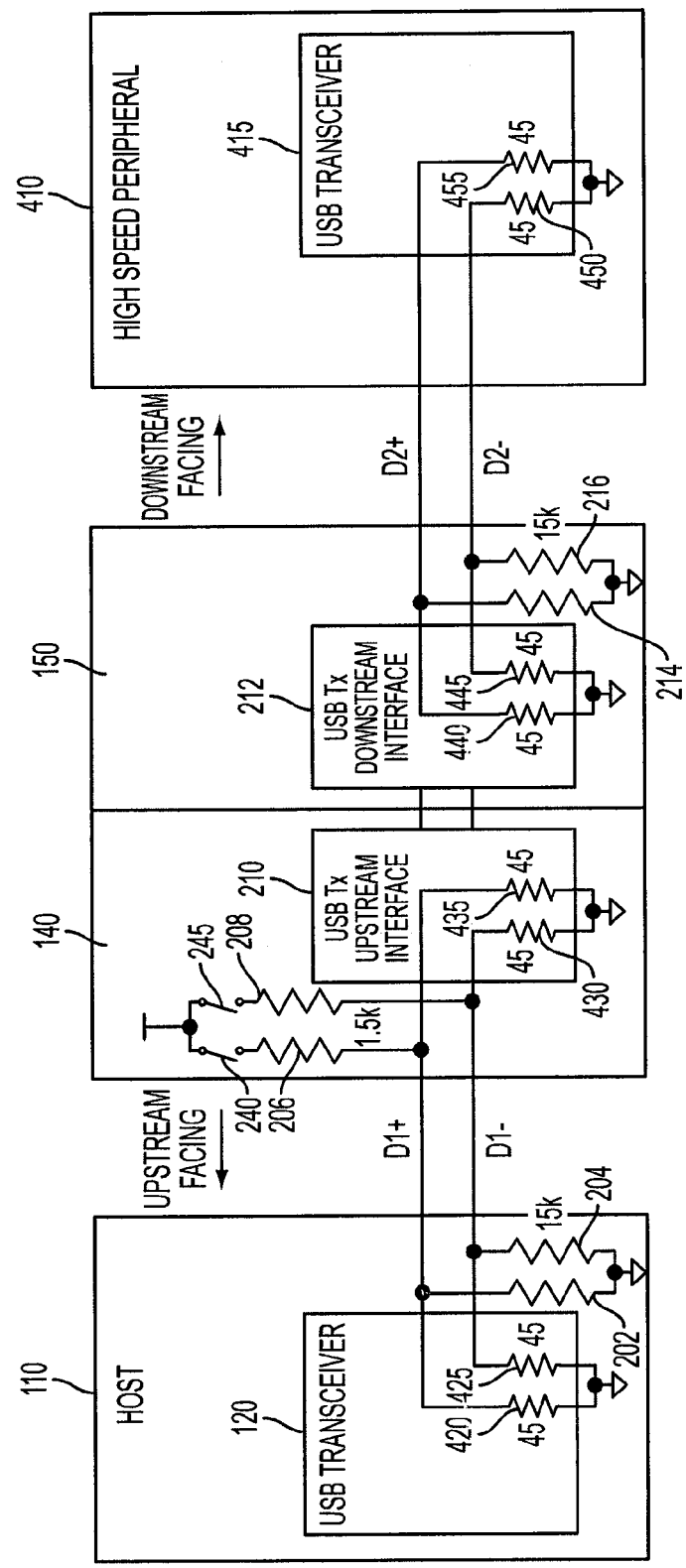
FIG. 4(a) depicts an isolated transceiver device connecting to a high speed peripheral device and a host/hub.
FIG. 4(b) depicts exemplary circuit for an isolated transceiver device capable of detecting the speed of a high speed peripheral device, according to an embodiment of the present teaching.
Figure 4:
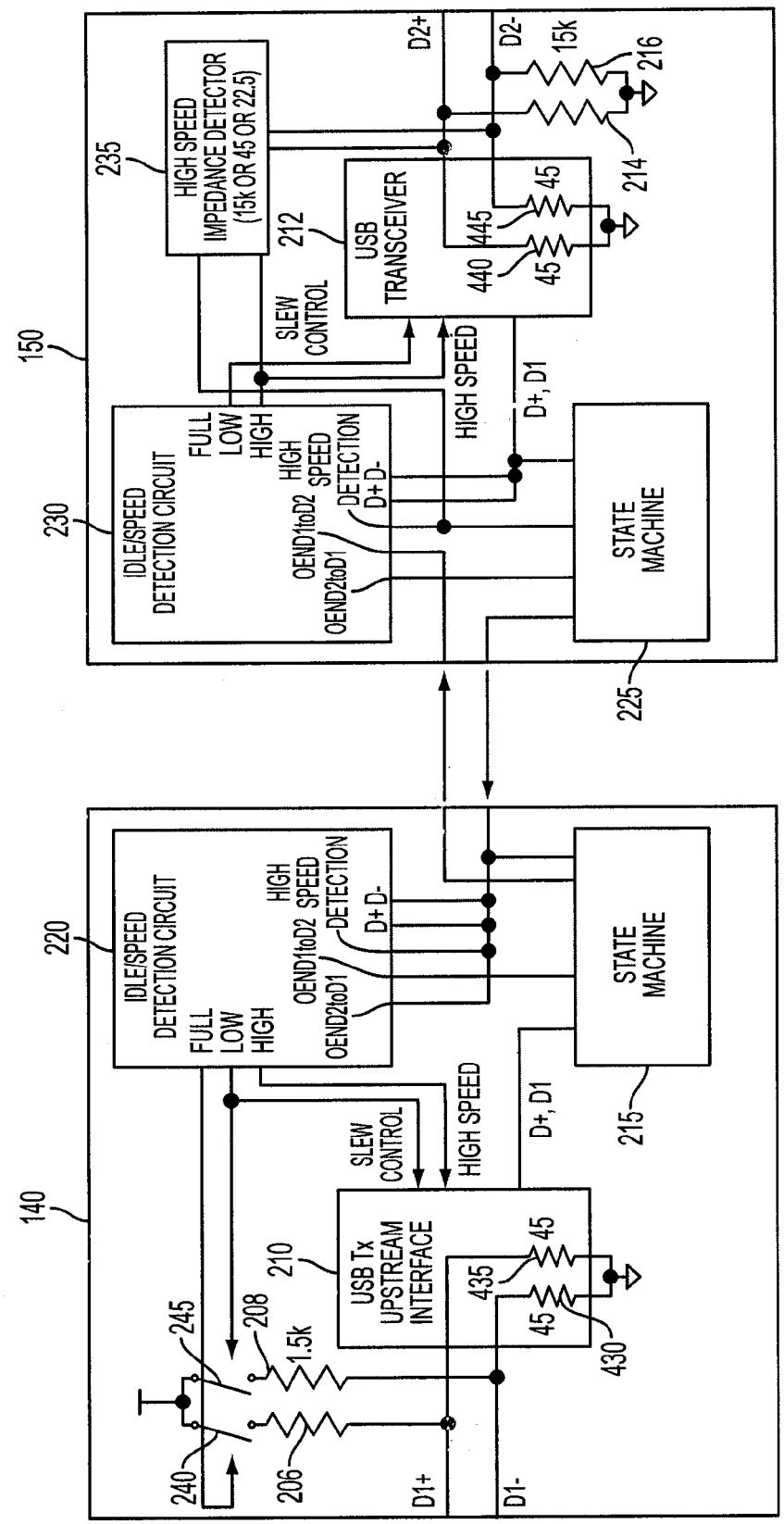

When the downstream facing circuit 150 observes a low on both D2− and D2+, it may indicate a disconnected downstream facing bus. If it is further sensed that the low on D2− and D2+ is due to a pair of termination resistors having, e.g., 45 Ohms of resistance, it indicates that the peripheral device has a downstream facing bus with a high speed. FIGS. 4(*a*) and 4(*b*) illustrate the configuration and circuitry for this setting. In FIG. 4(*a*), when D2+ and D2− are both low and an impedance from a pair of termination resistors 450 and 455 are detected, the upstream facing circuit 140 makes sure to switch off, via switches 240 and 245, the connection between the pair of pull up resistors 206 and 208. In addition, to match the sensed termination resistors, a pair of termination resistors 440 and 445 in the downstream facing circuit 150 and a pair of termination resistors 430 and 435 in the upstream facing circuit 140 are set to match that. With such dynamically configured resistors, the host/hub 110, when sensing the pair of termination resistors 430 and 435, will set its pair of termination resistors 420 and 425 to match the high speed configuration. In this way, the host/hub acts as if it is interfacing directly with the high speed peripheral device 160.

Matching the conditions of the downstream facing bus on the upstream facing bus dynamically provides a greater degree of flexibility. Although illustrated as an isolated device that can be made transparent to the host/hub and the peripheral device, the isolated transceiver device 130 as disclosed herein may also be implemented within a host, a hub, a bus splitter, or a peripheral device, enabling autonomous determination of bus speed conditions and reporting such detected dynamic conditions.

FIG. 4(b) depicts an exemplary implementation of the downstream and upstream facing circuits in detecting a high speed peripheral device and dynamically generating a resistor configuration to match with the observed conditions. The peripheral device 160 is determined to be high speed when a pair of 45-ohm termination resistors (450 and 455) is detected to connect to a reference ground. This is detected by a high speed impedance detector 235. In response to such detection, two pairs of termination resistors in the USB downstream (440 and 445) and upstream (430 and 435) interfaces are set. When the host/hub 110 detects the termination resistors 430 and 435, the host/hub 110 sets the host termination resistors (420 and 425 in FIG. 4(a)) to ensure to operate communication at high speed.

In operation, the high-speed impedance detector 235 reports the detected condition to the idle/speed detection circuit 230 and the packet process state machine 225. The idle/speed detection circuit 230 and the packet process state machine 225 are responsible for properly setting the termination resistors 440 and 445. A high speed indication signal is fed back from the idle/speed detection circuit 230 to the high speed impedance detector 235 so that the high speed impedance detector 235 can adjust the expected impedance that it will observe to 22.5 ohms (from 45 ohms) due to parallel termination. Such a high-speed indication is also communicated to the upstream facing circuit 140 and signaled to the idle/speed detection circuit 220 to control the upstream facing circuit 140 to properly set termination resistors 430 and 435.

Figure 5:
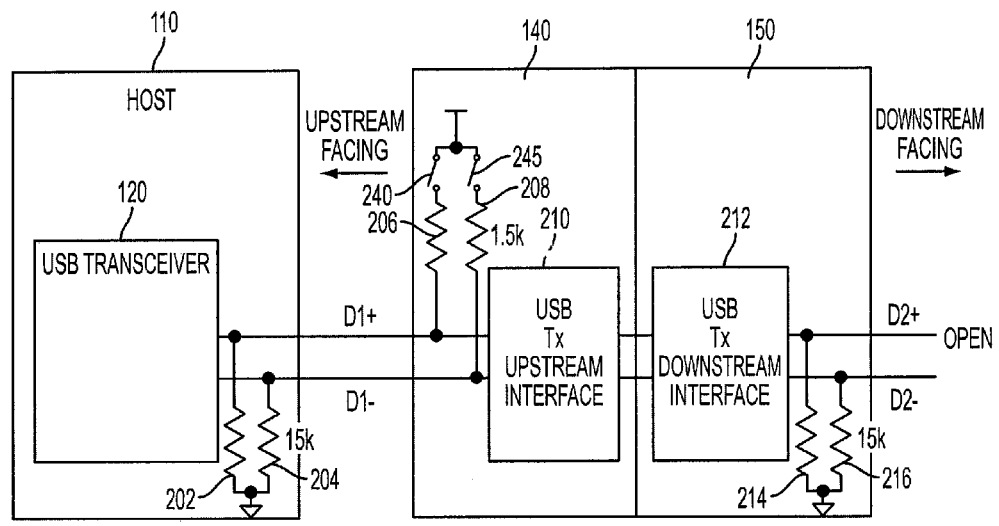
FIG. 5(a) depicts an isolated transceiver device which is disconnected from a peripheral device but is connected to a host/hub.
FIG. 5(b) depicts an exemplary circuit for an isolated transceiver device capable of detecting a disconnect state as to a peripheral device connection, according to an embodiment of the present teaching.
Figure 5:
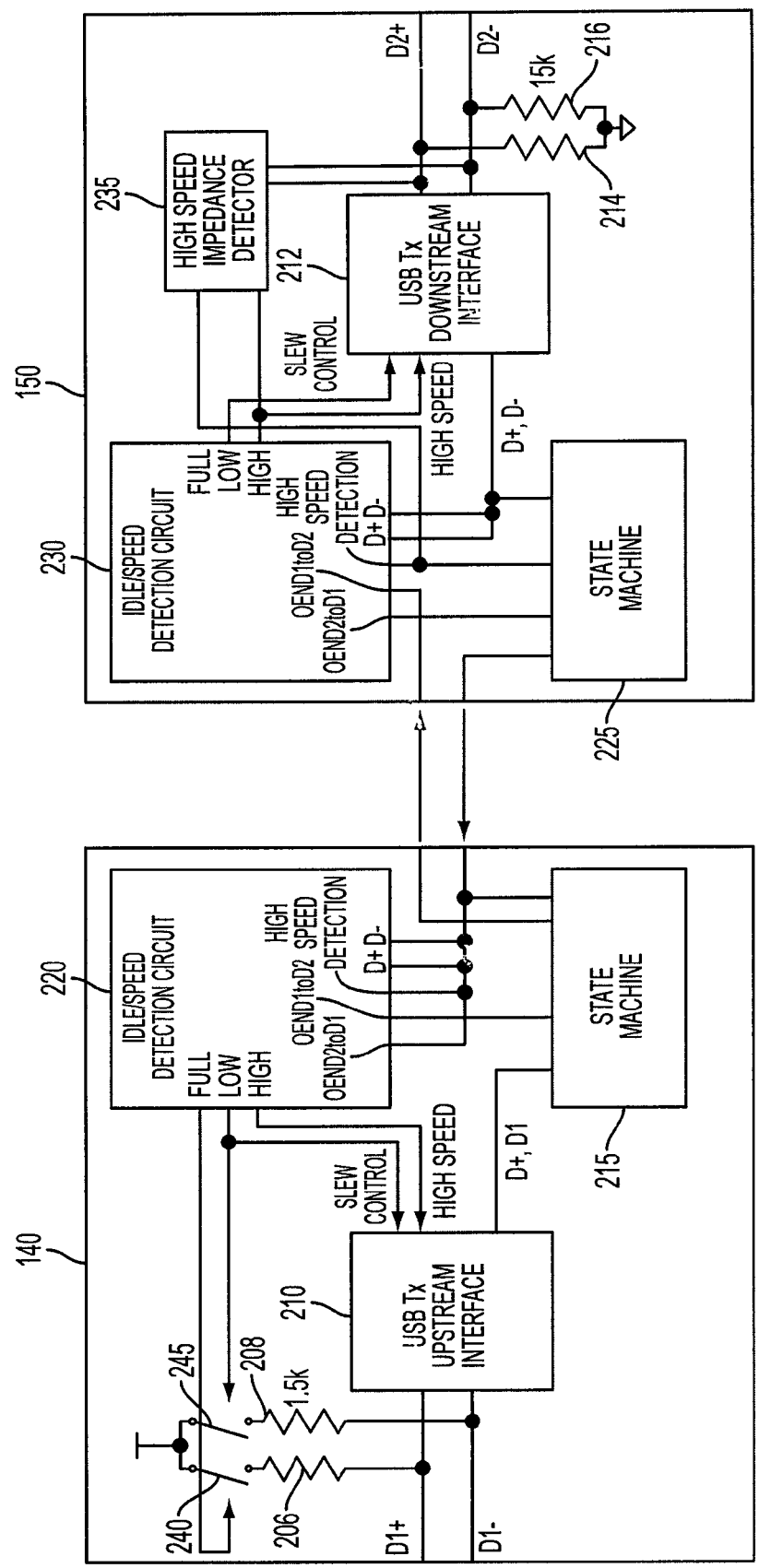

FIG. 5(a) depicts the isolated transceiver device connecting to a host device 110 but disconnected from a peripheral device, according to an embodiment of the present teaching. In this configuration, both D2+ and D2− are in an open condition and such a configuration is observed by the downstream facing circuit 150 and reported to the upstream facing circuit 140. Accordingly, the upstream facing circuit 140 controls switches 240 and 245 to be at an off position so that both pull up resistors 206 and 208 are not connected to D1+ and D1− to replicate the observed open configuration. In this case, the host 110 observes the 15 k ohm pull down resistors on D1+ and D1− and waits for a new connection.

The key features that enable an automatic configuration of the speed setting resistors in an isolated USB transceiver are the following: automatic selection of the correct bus speed indicators for USB low, full, and high speed peripheral communication, a pair of switched pull up resistors selected to match the observed speed of the downstream device or a single pull up resistor with a pair of switches controlled by the monitored speed of the downstream device for low and full speed busses, a pair of switched termination resistors selected to match the observed speed of the downstream device for a high-speed bus, a repetitious refresh data packet sent from the downstream device to the upstream device containing the idle state information of the downstream bus, a transmission of idle state data across the isolation barrier during inter USB packet transmissions and during USB bus initialization, and a method of mirroring the state of a downstream USB bus to the upstream USB bus based on the repetitious refresh data packet that contains bus speed information. Comparing this configuration with that in the case of high speed peripheral device (FIGS. 4(a) and 4(b)), no termination resistor is set.

FIG. 5(b) depicts an exemplary implementation of the downstream and upstream facing circuits and the configurations related to the situation in which there is no peripheral device connected. Similar components are present and operate in the manner as described before. However, in this case, since the configuration observed at D2+ and D2− is an open configuration, the isolation transceiver device 130 does not configure the termination resistors.

Figure 6:
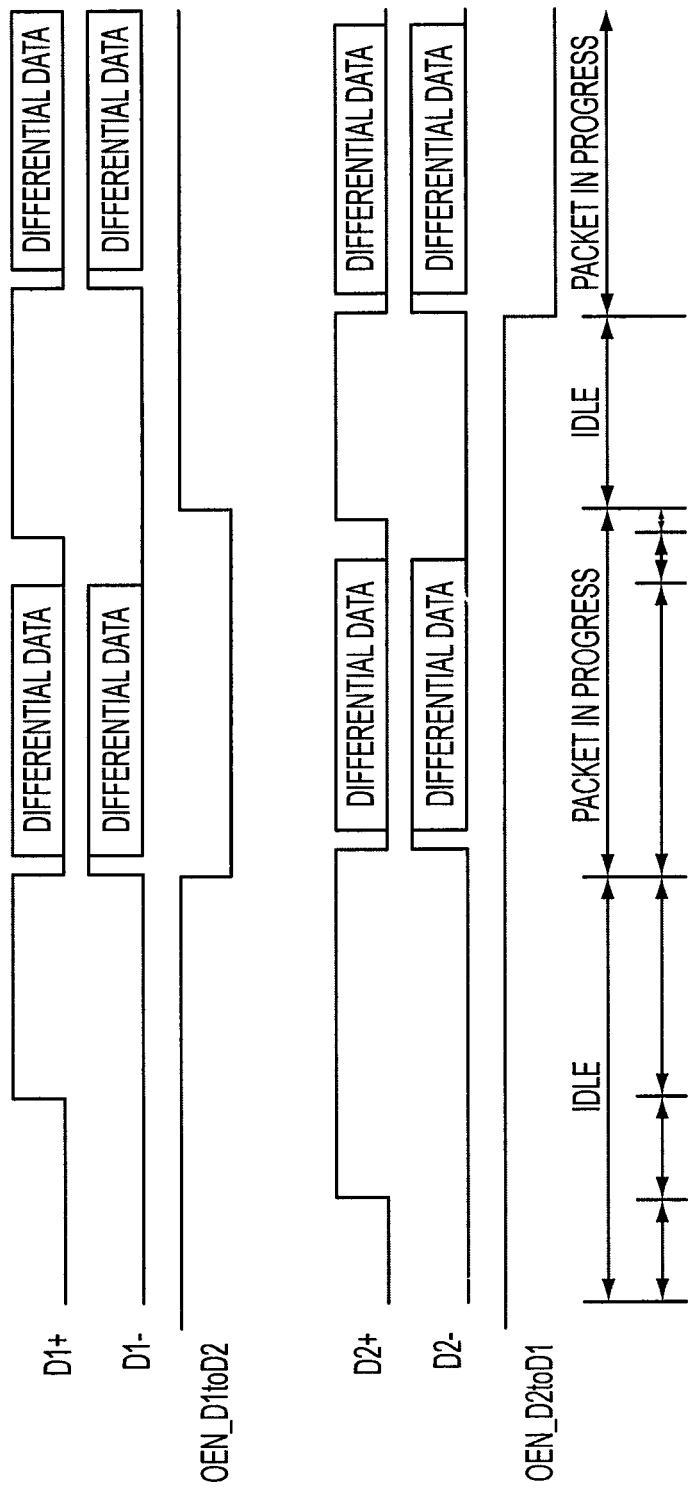
FIG. 6(a) shows exemplary USB signals through an isolation barrier between upstream and downstream sides when a full speed peripheral device is connected, according to an embodiment of the present teaching.
FIGS. 6(b)-6(c) show exemplary isolation communication packets.
Figure 6:
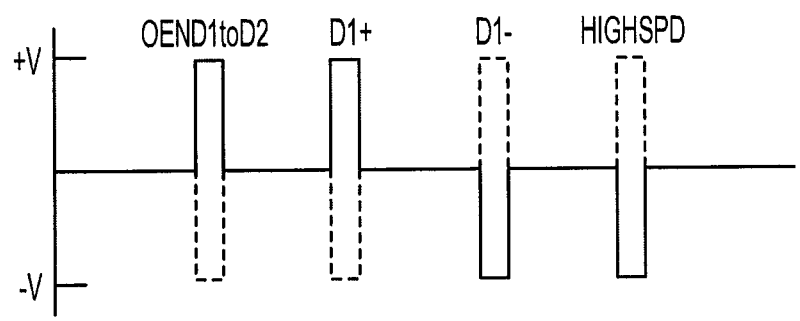
Figure 6:
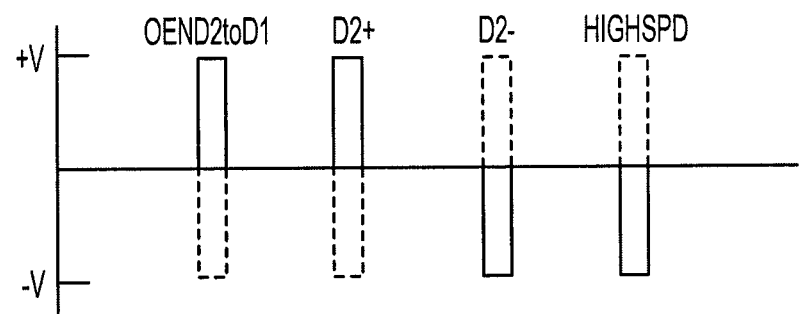

FIG. 6(a) shows the signals and sequence of events associated with the isolated communication between the downstream and upstream facing circuits 150 and 140, illustrated in a full speed peripheral connection. Initially signals D2+ and D2− are low (605), indicating a disconnect configuration. In this case, D1+ and D1− mirror their states. At this point, output enable signals OEN_D2toD1 (645) and OEN_D1toD2 (650) are high, disabling the USB output drivers. The indication of an idle state is present when OEN_D2toD1 and OEN_D1toD2 are both high. D2+ transitions (e.g., during 610 and 640) indicate a connection of a full speed peripheral device. Such a transition is detected and propagated to the upstream side (655) through a refresh transmission across the isolation transceiver device 130. The propagation makes D1+ goes high accordingly (615). The host device initiates a k-state transition (620) starting a packet-in-progress period (625). During this packet-in-progress period, the k-state transition is carried out on D1+ and D1−, indicating a packet is beginning.

After signal OEN_D1toD2 transitions to low, the downstream facing circuit is enabled, which exits the idle mode and begins the packet-in-progress state. After a k-state is detected, packet data is transferred during 625 and followed by an end of packet signature period 630. At 635, a final j-state period is initiated, indicating that the packet is complete and during 640, the bus returns to the idle state.

FIG. 6(b) shows an exemplary sequence of communication packets of data that is communicated across the isolation transceiver device 130. In some embodiments, signals OEN_D1toD2 (670), D1+ (675), D1− (680), and a high speed indicator (685) are communicated in a bit stream form from the upstream facing circuit 140 to the downstream facing circuit 150. Similarly, signals OEN_D2toD1 (690), D2+ (692), D2− (694), and a high speed indicator (696) are communicated in a bit stream form from the downstream facing circuit 150 to the upstream facing circuit 140.

Figure 7:
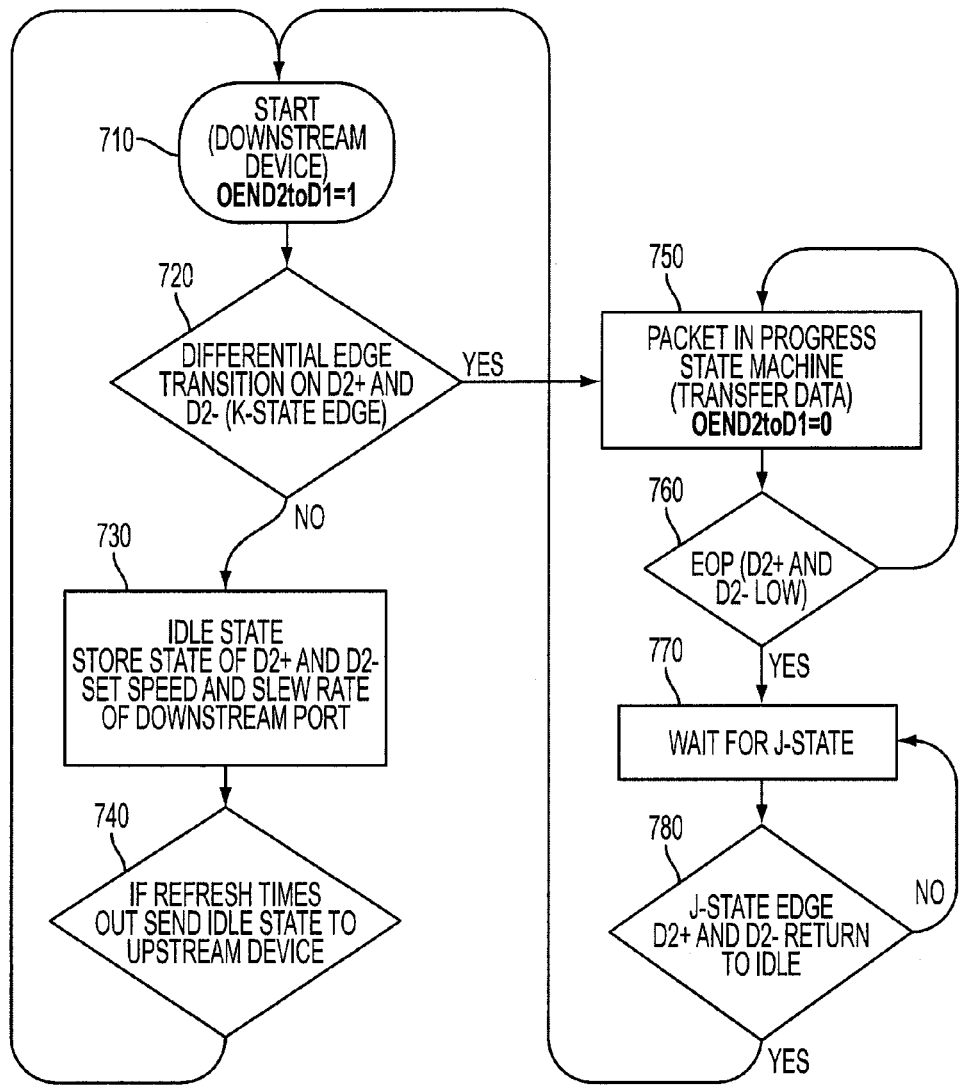
FIG. 7 is a flow of an exemplary process in which an idle state is detected on the downstream side to determine downstream speed, according to an embodiment of the present teaching.

FIG. 7 is a flow of an exemplary process in which an idle state is detected on the downstream side to determine downstream speed, according to an embodiment of the present teaching. At 710, signal OEND2toD1 is set high (disabled) as an initial state. Then, it is determined, at 720, whether a differential edge transition on D2+ and D2− is present. If the edge transition is not present, an idle state is detected and the current state defined by signals D2+ and D2− is stored at 730, and the peripheral device's speed and slew rate information is set in the downstream facing circuit 150. When a refresh timer expires, determined at 740, the idle state and device speed information are sent, at 745, to the upstream facing circuit 140 from the downstream facing circuit 150. Otherwise, the system continues to wait until the refresh timer expires.

When a differential edge is detected, at 720, it indicates that it is not in an idle state and it is in a packet-in-progress period. In this case, signal OEND2toD1 is set low at 750. During the packet-in-progress period, the end of packet (EOP) condition (both D2+ and D2− are low) is checked at 760. When the EOP is encountered, the state machine at the downstream facing circuit 150 enters, at 770, into a j-state transition period. When the j-state ends, detected at 780, it is in an idle state and in this case, the processing loops back to step 710.

Figure 8:
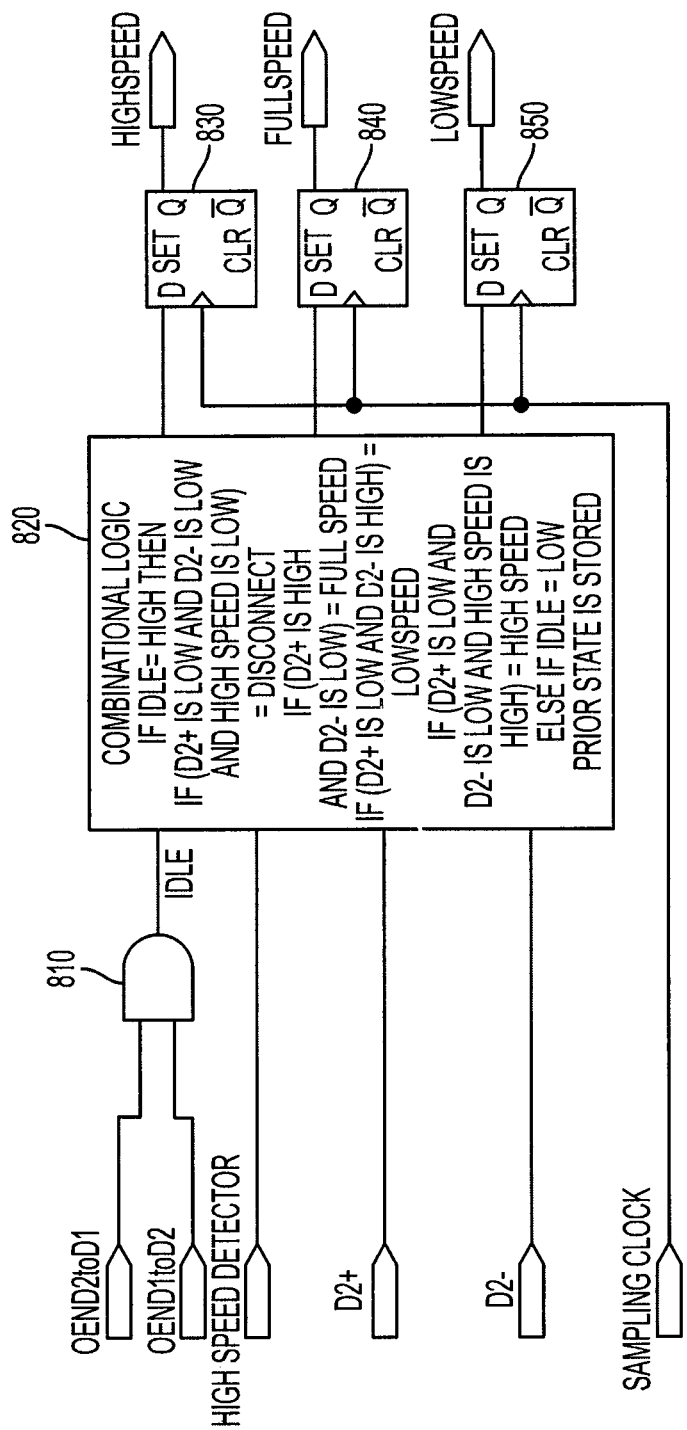
FIG. 8 depicts an exemplary circuit for detecting an idle state configuration in order to determine the speed of a peripheral device, according to an embodiment of the present teaching.

FIG. 8 depicts an exemplary implementation for the idle/speed detection circuit, according to an embodiment of the present teaching. To detect an idle state, signals OEND2toD1 and OEND1toD2 are sent to an AND gate 810 so that whenever both signals are high, the output of the AND gate 810 is high, indicating an idle state. This idle state indication signal, together with signals D2+, D2−, a clock signal, and an input 805 from the high speed impedance detector 235, is fed to a combinational logic circuit 820, which then generates different peripheral device speed indicators, high speed indicator 830, full speed indicator 840, and low speed indicator 850 as its outputs.

The logic achieved by the combinational logic circuit 820 is the following. When an idle state is detected, the combinational logic circuit 820 examines different conditions based on various signals to determine the peripheral device's speed. If both D2+ and D2− are low, and the high speed indicator 805 is low, then it is in a disconnect state. If D2+ is high but D2− is low, the peripheral device is a full speed device. In this case, the output 840 is set high indicating a full speed peripheral device. If D2+ is low and D2− is high, the peripheral device is a low speed device. In this case, the output 850 is set high indicating a low speed peripheral device. If both D2+ and D2− are low and the high speed indication signal 805 is high, the peripheral device is a high speed device. In this case, the high speed indicating signal 830 is set high. If the idle state input signal is low, then a prior state is stored in the combinational logic circuit 820 so that the prior state is maintained.

Figure 9:
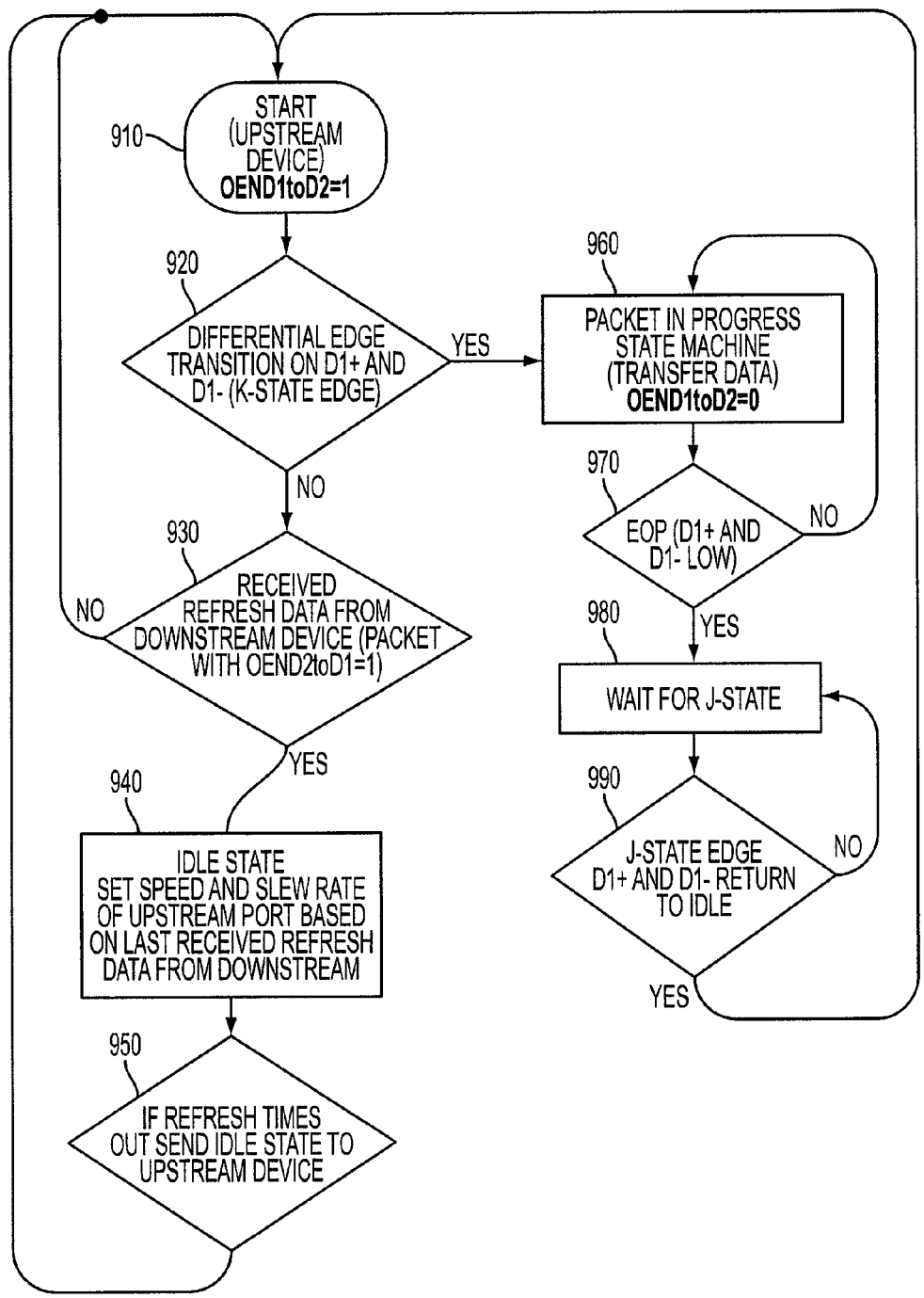
FIG. 9 is a flow of an exemplary process in which an idle state is detected on the upstream side to determine upstream speed, according to an embodiment of the present teaching.

FIG. 9 is a flow of an exemplary process for detecting the idle state in the upstream facing circuit, according to an embodiment of the present teaching. At 910, the upstream facing circuit 140 first set OEND1toD2 to high. Then, it is examined, at 920, whether a differential edge transition on D1+ and D1− is present. If such a differential edge transition is not detected, an upstream idle state is detected and it is further checked, at 930, to see whether a refresh packet is received (with OEND2toD1 set to high) from the downstream facing circuit 150. If such a refresh packet is received from the downstream facing circuit 150, a downstream idle state is detected, the upstream facing circuit proceeds to set, at 940, the peripheral device speed and slew rate for the upstream port based on the received refresh data from the downstream facing circuit 150. The peripheral device speed and the slew rate are determined based on signals D2+, D2−, and the high speed indication signal from the high speed impedance detector.

At 950, it is examined to see whether the refresh timer expires. When the refresh timer expires, the upstream facing circuit 140 sends, at 955, the upstream idle state to the downstream facing circuit 150. If a differential edge transition is detected at 920, it indicates that a packet is in progress. In this case, signal OEND1toD2 is set low. The process waits, at 980, until the end of packet (EOP) is encountered at 970. In this case, the packet is further processed until a j-state transition edge is observed at 990. In this case, D1+ and D1− are set to the idle state and the processing returns to step 910.

Figure 10:
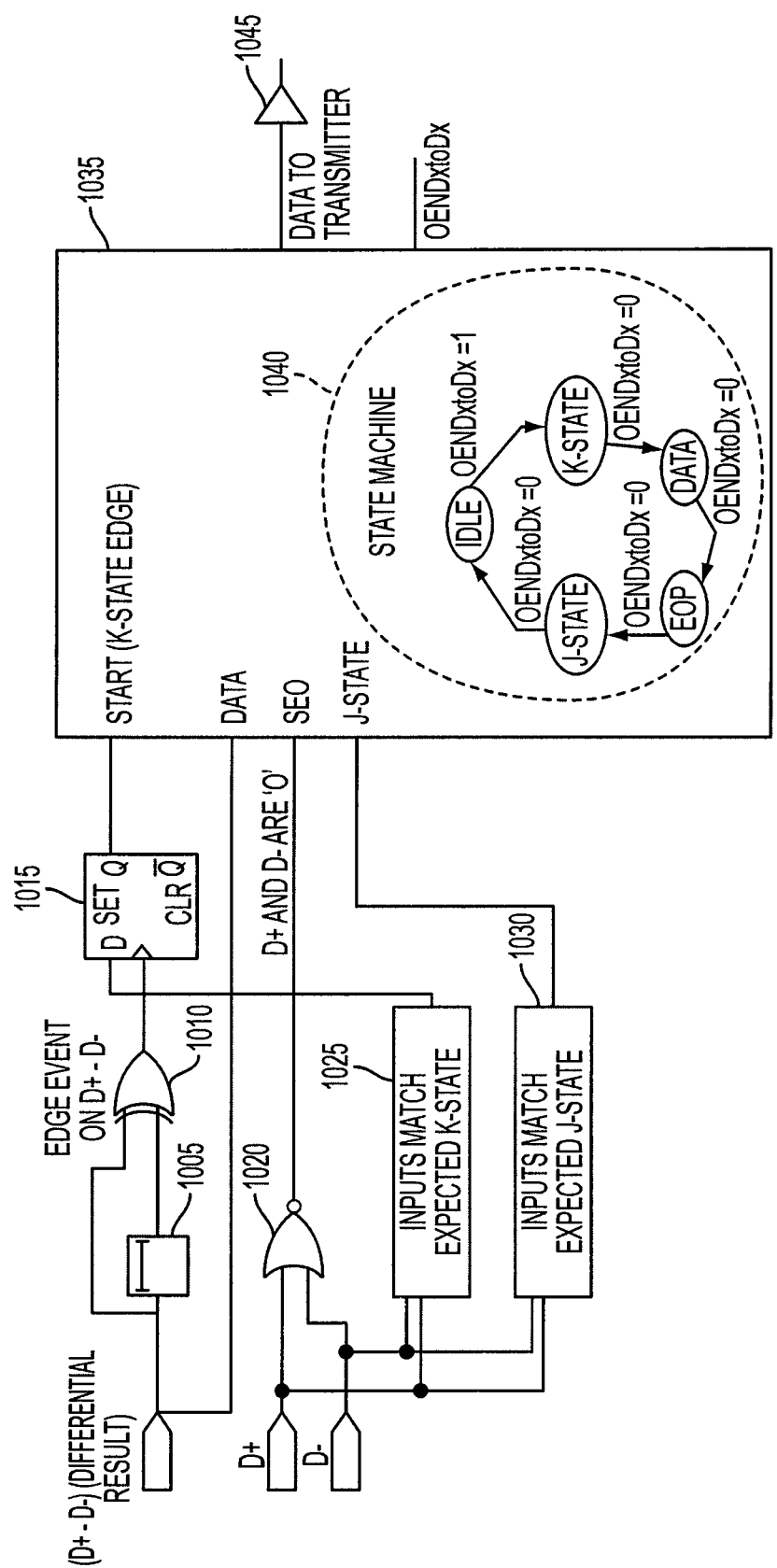
FIG. 10 shows an exemplary implementation of a packet process state machine capable of idle detection, according to an embodiment of the present teaching.

FIG. 10 shows an exemplary implementation of a circuit for detecting a packet-in-progress based on a state machine, according to an embodiment of the present teaching. The state machine starts at the idle state 1035 where OENDxtoDx is high. An edge event detector 1010 triggers the state machine 1040 to enter into a k-state state 1035 where OENDxtoDx is low. When the state machine 1040 observes a k-state detected by circuit 1025 and edge event detector 1010, it exits the idle state and enters the k-state 1050 setting OENDxtoDx low. Then the state machine enters the data processing state 1055 until an end of packet (D+ and D− are '0') is detected by gate 1020 and a j-state is detected by circuit 1030. When that occurs, the state machine transits from state 1055 to 1060 and then to 1065. The detected k-state (by 1025) and j-state (by 1030) are matched to the expected speed state for the state machine to start and to end. Once the j-state is detected, the state machine returns to idle state 1035 and sets OENDxtoDx high.

Figure 11:
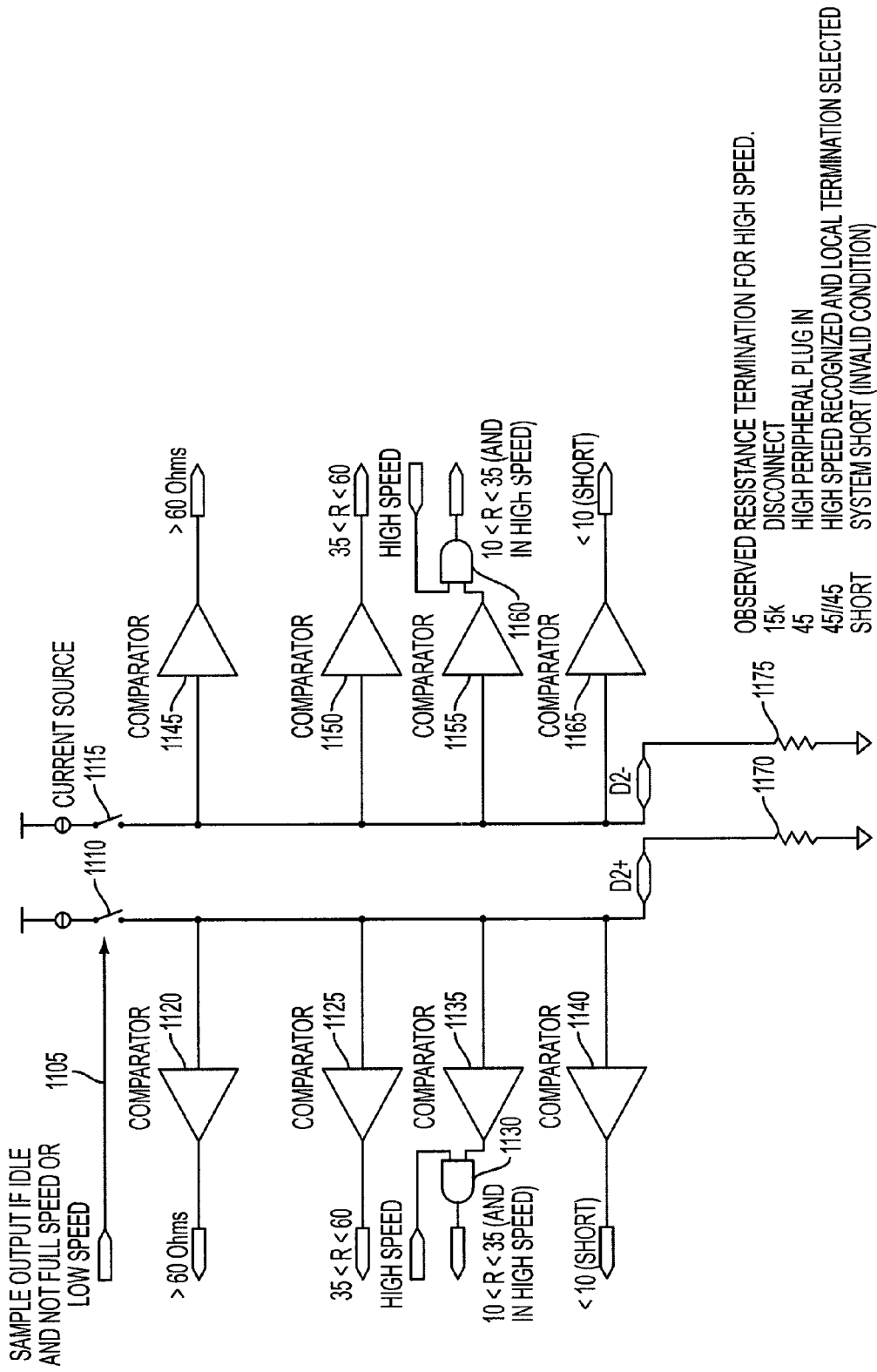
FIG. 11 depicts an exemplary circuit for detecting high speed impedance, according to an embodiment of the present teaching.

FIG. 11 depicts an exemplary implementation of the high-speed impedance detector 235, according to an embodiment of the present teaching. In this illustrated embodiment, the high speed impedance detector 235 compares the voltages in the external termination resistance from a known current sources 1102. The detector samples at 1105 the downstream port if it is idle and the idle speed detection is not set to low or full speed. The sampled resistances are compared, by comparator 1120 and 1145, to see if it is greater than 60 Ohms for a 15K ohm pull down. The sampled resistance is also compared, by comparators 1125 and 1150, to see if it is between 35 and 60 ohms when a high speed is not yet determined. The sampled resistance is also compared, by comparators 1135 and 1155, to see if it is between 10 and 35 ohms when a high speed has been detected. Furthermore, the sampled resistance is compared, by comparators 1140 and 1165, to see if it is less than 10 ohms and if so, it is determined to be a short.

If the comparison result indicates that the sampled resistances are greater than 60 ohms on both D2+ and D2−, the port is disconnected. If the sampled resistances are between 10 and 60 ohms, the port is configured for high speed. If the port is shorted, high speed will not be set.

Figure 12:
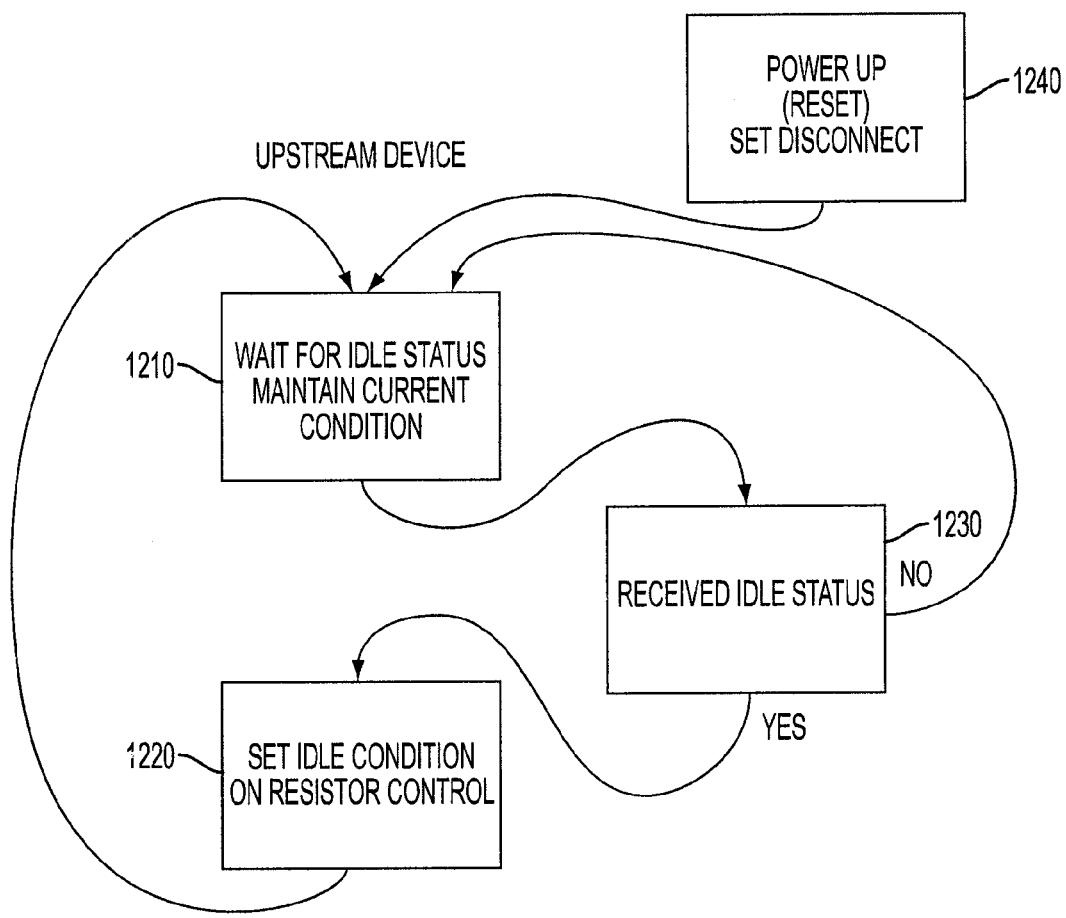
FIG. 12 is an exemplary state diagram relating to timing control in terms of speed detection and setting during an idle state, according to an embodiment of the present teaching.

FIG. 12 shows an exemplary process of the upstream facing circuit 140, in which the upstream facing circuit 140 receives idle states information from a downstream facing circuit and then operates accordingly based on the received idle state information. In FIG. 12, initially the system is set or reset, at 1240, to the disconnect state. In operation, the upstream facing circuit waits, at 1210, for idle status in the form of a refresh communication from the downstream facing circuit. At this point, the current idle state is maintained until it is updated by a downstream refresh communication. Refresh communications may be set to occur on a regular interval unless a USB packet is detected at the downstream facing circuit. As discussed herein, the refresh communication will not occur until idle conditions are detected. That is, the upstream facing circuit 140 may receive refresh communications from the downstream facing circuit 150 only when idle states are detected. When the upstream facing circuit 140 receives the idle status, the idle conditions can be set, at 1220, and pull up resistors or pull down termination resistors on the upstream facing circuit 140 may be set.

Figure 13:
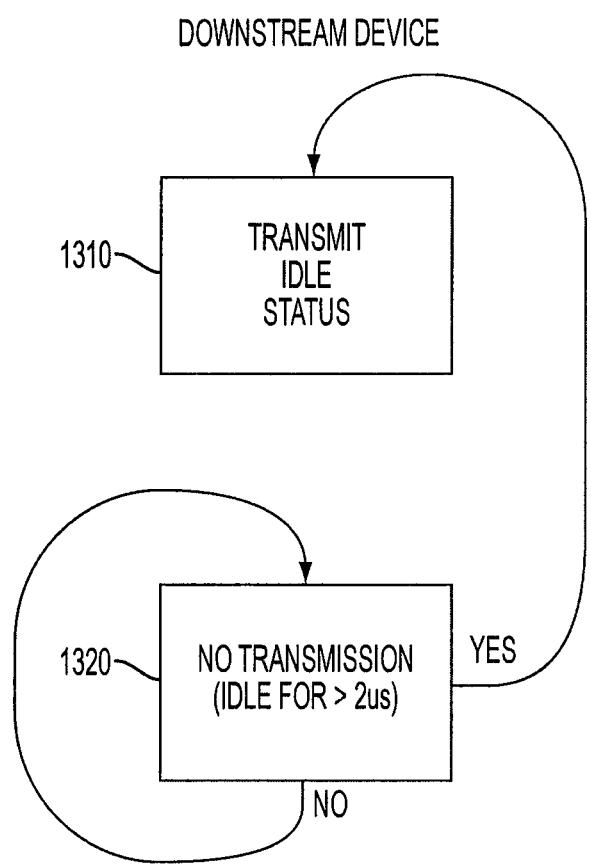
FIG. 13 is an exemplary state diagram according to which a downstream facing circuit operates.

FIG. 13 shows an exemplary process of the downstream facing circuit 150, in which the downstream facing circuit 150 communicates idle states information to the upstream facing circuit and then operates accordingly based on the received idle state information. Idle status information may be transmitted, at 1310, from the downstream facing circuit 150 to the upstream facing circuit 140. After that, the downstream facing circuit 150 stall such transmission during an idle of a period (e.g., 2 micro-seconds) before it can transmit such information next.

While the inventions have been described with reference to the certain illustrated embodiments, the words that have been used herein are words of description, rather than words of limitation. Changes may be made, within the purview of the appended claims, without departing from the scope and spirit of the invention in its aspects. Although the inventions have been described herein with reference to particular structures, acts, and materials, the invention is not to be limited to the particulars disclosed, but rather can be embodied in a wide variety of forms, some of which may be quite different from those of the disclosed embodiments, and extends to all equivalent structures, acts, and, materials, such as are within the scope of the appended claims.

I claim:

1. A Universal Serial Bus (USB) isolating device, comprising:
    a downstream facing circuit coupled to a peripheral device via a first pair of signals, configured for detecting a speed at which the peripheral device is operating based on a first resistor configuration on the first pair of signals;
    an upstream facing circuit coupled to the downstream facing circuit and, via a second pair of signals, to a host or hub, the upstream facing circuit being configured for communicating with the downstream facing circuit on the speed of the peripheral device and adaptively creating a second resistor configuration on the second pair of signals to facilitate the host or hub to adapt to the speed of the peripheral device;
    an impedance detector for detecting the first resistor configuration which indicates a disconnect condition when the peripheral device is disconnected, and a connected condition when the peripheral device is connected; and
    a detection circuit for receiving detected information from the impedance detector to identify an idle state, determine the speed of the peripheral device during the idle state, and to control the setting of the peripheral device's speed configuration during the idle state, wherein the idle state is a period between consecutive data transmissions, the detection circuit having a configuration that receives detected information from the impedance detector to identify subsequent idle states, determines the speed of the peripheral device during each identified subsequent idle state, and controls the setting of the peripheral device's speed configuration during each identified subsequent the idle state, each subsequent idle state also being a period between subsequent consecutive data transmissions.

2. The device of claim 1, wherein the peripheral device is one of a peripheral application device, a hub, or a bus splitter.

3. The device of claim 1, wherein the speed of the peripheral device includes one of low, full, and high.

4. The device of claim 1, wherein the downstream facing circuit comprises:
    a USB transceiver downstream interface coupled to the first pair of signals;
    the impedance detector coupled to the first pair of signals, configured for detecting the first resistor configuration and impedance on the first pair of signals;
    the detection circuit coupled to the USB transceiver downstream interface and the impedance detector, configured for determining the speed of the peripheral device based on the first resistor configuration; and
    a first state machine coupled to the USB transceiver downstream interface and the first speed detection circuit, configured for controlling a first timing of detecting the first resistor configuration, the impedance detected by the impedance detector, and the speed, as well as a second timing of communicating the speed to the upstream facing circuit.

5. The device of claim 1, wherein the upstream facing circuit comprises:
    a second speed detection circuit coupled to the downstream facing circuit, configured for communicating with the downstream facing circuit regarding the speed of the peripheral device and impedance and for replicating the impedance to yield the second resistor configuration on the second pair of signals;
    a USB transceiver upstream interface coupled between the second speed detection circuit and the second pair of signals, configured for facilitating adaptively adjust the speed and a slew rate; and
    a second state machine coupled to the USB transceiver upstream interface and the second speed detection circuit, configured for controlling the timing of communication between the upstream facing circuit and the downstream facing circuit, wherein
    the impedance is replicated so that the host or hub observes an impedance on the second pair of signals identical to that on the first pair of signals.

6. The device of claim 1, wherein the speed detected is communicated from the downstream facing circuit to the upstream facing circuit via refreshed static data.

7. A method for a Universal Serial Bus (USB) isolating device, comprising the steps of:
    detecting, at a first timing by a downstream facing circuit in the USB isolating device, a speed at which a peripheral device is operating based on a first resistor configuration on a first pair of signals through which the downstream facing circuit is coupled to the peripheral device;
    communicating the detected speed from the downstream facing circuit to an upstream facing circuit in the USB isolating device at a second timing;
    creating, by the upstream facing circuit, a second resistor configuration on a second pair of signals, through which the upstream facing circuit couples to a host or hub, to facilitate the host or hub to adapt to the speed of the peripheral device; and
    based on the first resistor configuration, identifying an idle state, determining the speed of the peripheral device during the idle state,
    wherein the idle state is a period between consecutive data transmissions, and controlling the setting of the peripheral device's speed configuration during the idle state,
    repeating the detecting, communicating, creating, and identifying during subsequent idle states, each of which is between subsequent consecutive data transmissions.

8. The device of claim 7, wherein the peripheral device is one of a peripheral application device, a hub, or a bus splitter.

9. The method of claim 7, wherein the speed of the peripheral device includes one of low, full, and high.

10. The method of claim 7, wherein the step of detecting the speed comprises the steps of:
    detecting, at the first timing by an impedance detector coupled to the first pair of signals, the first resistor configuration and an impedance observed on the first pair of signals; and
    determining, by a first speed detection circuit coupled to the impedance detector, the speed of the peripheral device based on the detected first resistor configuration.

11. The method of claim 10, wherein the first timing is determined by a first state machine coupled to the first speed detection circuit and is used to control that the first resistor configuration is detected when the peripheral device is at an idle state.

12. The method of claim 10, wherein the second timing is determined by the first state machine to control the second timing by which the detected speed is communicated from the downstream facing circuit to the upstream facing circuit.

13. The method of claim 7, wherein the step of creating comprises the steps of:
    receiving, at the second timing by a second speed detection circuit in the upstream facing circuit, information regarding the speed of the peripheral device and an impedance observed on the first pair of signals;

replicating the impedance observed on the first pair of signals with respect to the second pair of signals to yield the second voltage configuration on the second pair of signals; and adaptively adjusting a slew rate.

14. The method of claim 13, wherein the second timing is determined by a second state machine coupled to the second speed detection circuit and is used to control the timing of communication between the upstream facing circuit and the downstream facing circuit, wherein the impedance is replicated so that the host or hub observes an impedance on the second pair of signals identical to that detected by the downstream facing circuit on the first pair of signals.

15. The method of claim 7, wherein the speed detected is communicated from the downstream facing circuit to the upstream facing circuit via refreshed static data.

* * * * *